Patented Dec. 22, 1942

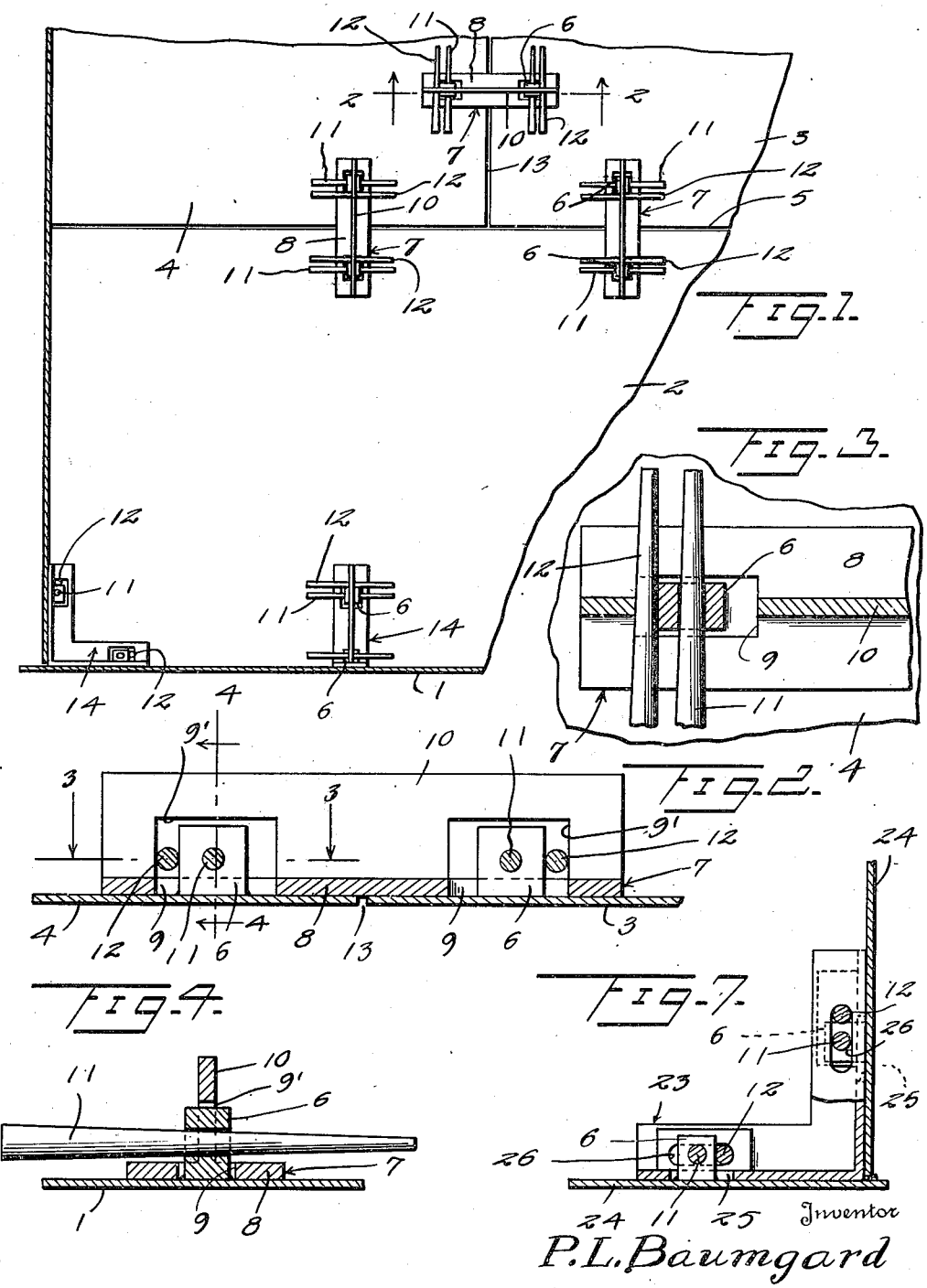

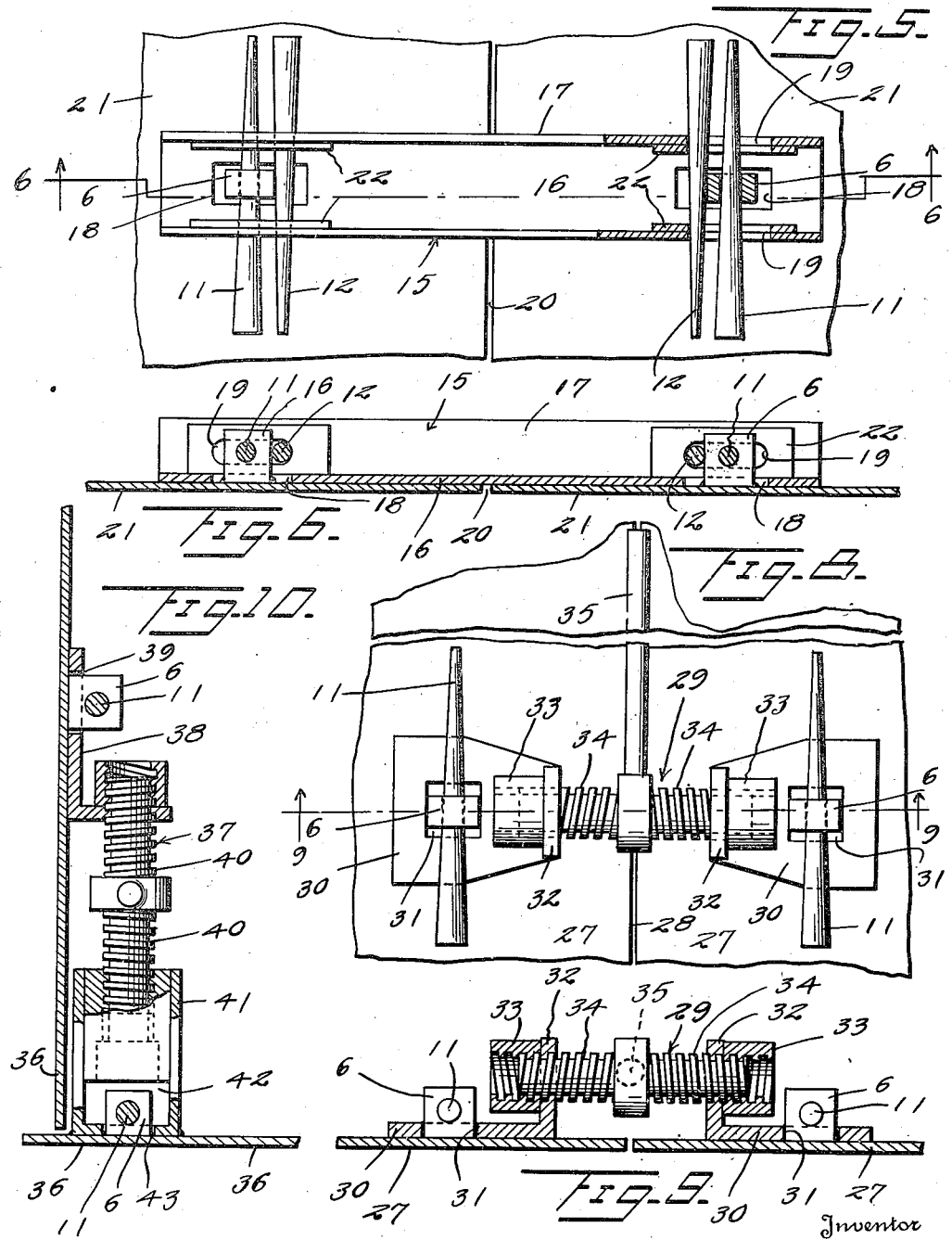

2,306,032

UNITED STATES PATENT OFFICE 2,306,032

COUPLING APPARATUS FOR USE IN WELDING

Phillip L. Baumgard, Port Arthur, Tex.

Application April 13, 1940, Serial No. 329,553

6 Claims. (Cl. 113—99)

This invention relates to devices for use in the construction of sheet metal structures, where the units of the structure are butt-welded, for securing and holding such units in the proper relation to be welded together.

In the construction of sheet metal structures, greater use is continually being made of butt-welding for securing the units of such structures together in place of the older method of bolting or riveting, and in assembling such sheet units, it is necessary that the same be securely held in a predetermined edge to edge relation or in the relation of an edge of one sheet to the side of another so that the proper welded connection may be made between the sheets.

The primary object of the present invention is to provide an improved and a simple means or apparatus by which sheets of metal, which are to be welded together, may be drawn together in proper alinement and held temporarily in the proper relation preparatory to and during the welding of the sheets together.

Another object of the invention is to provide a tool or apparatus for accomplishing the above stated object, which may be easily placed in position and manipulated as necessary to draw a pair of sheet metal bodies together and which cannot become displaced or become disconnected from the sheets accidentally as a result of jarring or vibration of the sheets.

Another object is to provide a tool or apparatus for accomplishing the above described object which is designed for use in an angle formed between two sheets of metal whereby to not only draw the two sheets together in an angular relation but to rigidly hold the sheets and cause them to assume the proper angular relation.

Still another object is to provide a simple tool for carrying out the above described objects, which is strong enough to accomplish the desired purpose and yet economical to manufacture, light enough to insure economy in handling and using, and designed so that it may be readily detached from the work and used repeatedly and flexible enough to meet all of the requirements for "fitting up" or tentatively holding in place structural units which are to be secured together by welding.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view illustrating a portion of a structure comprised of a number of sheets of material showing the application of one form of the present invention in joining such sheets together.

Fig. 2 is a sectional view on the line 2—2 of Fig. 1.

Fig. 3 is a sectional view on the line 3—3 of Fig. 2.

Fig. 4 is a sectional view on the line 4—4 of Fig. 2.

Fig. 5 is a view partly in elevation and partly in section illustrating another form of the coupling apparatus.

Fig. 6 is a longitudinal sectional view taken substantially on the line 6—6 of Fig. 5.

Fig. 7 is a detail view partly in side elevation and partly in longitudinal section of an angled form of the device shown in Fig. 5.

Fig. 8 is a view in plan illustrating the further modification of the apparatus.

Fig. 9 is a sectional view taken substantially on the line 9—9 of Fig. 8, the lugs being in elevation.

Fig. 10 is a view partly in elevation and partly in longitudinal section of the modified form of the device shown in Fig. 8 for use in an angle.

Referring now more particularly to the drawings, it will be seen that there are illustrated several different forms of tools for securing sheet metal bodies in position for welding but in all forms shown, the general method of use and the ultimate result obtained is the same, that is, each form employs a bridging element which connects across the joint between two structural pieces, means for connecting such bridging element to the adjacent structural pieces in such a manner that the bridging element cannot become accidentally displaced or fall from position, and means which is shiftable relative to and which forms a part of the bridging element whereby to draw the two structural pieces into the desired relation.

In describing the several forms of the tool, reference will first be had to the form illustrated in Figs. 1 to 4. In Fig. 1 there is shown a portion of a sheet metal structure wherein there is illustrated a bottom sheet 1 and the vertical wall sheets 2, 3 and 4, the wall sheet 2 being disposed on edge upon the bottom sheet 1. These sheets 2, 3 and 4 may represent sections of a circular structure such as a tank or they may represent merely flat sheets built up upon the bottom sheet 1 to form one side wall of a tank or other similar structure.

In carrying out the present invention, two sheets such, for example, as sheets 2 and 3, which are to have their edges welded together, have secured to their faces upon opposite sides of the joint 5, which is formed between the opposing edges of the sheets, the apertured lugs 6, the apertures of which are alined transversely of the seam 5. These lugs may constitute ordinary nut blanks and are welded or otherwise suitably secured to the sheets, at the proper distances from the adjacent edges of their respective sheets to be engaged in aperturs of a bridging unit. Such bridging unit is indicatd generally by the numeral 7 and comprises a section of a T-beam of suitable weight which has formed through the head portion 8 the spaced longitudinally extending lug receiving openings 9. These openings are extended into the web portion 10 of the bridging unit, as indicated at 9'. The bridging unit is disposed against the outer sides of the plates 2 and 3 with a lug 6 of each plate extended into the openings 9—9', the back of the head 8 being against the plates so that the web 10 extends outwardly. Each of the apertured lugs 6 then has a drift pin 11 extended therethrough, such pins securely locking the bridging element in position. It will be noted that the openings 9 are of a length materially greater than the thickness of the lug 6 which extends thereinto, so that the bridging member may have slight movement across the joint 5. After the bridging member has been secured or mounted in position upon the lugs 6 and held by the drift pins 11 against falling from position, there are then inserted through each of the web openings 9', upon one side of the lug therein, a wedge pin 12.

It is desirable that a certain gap or spacing be obtained at the joint 5 between the edges of the plates, therefore, where the plates rest one upon the other as in the case of plates 2 and 3 or plates 2 and 4, the wedge pins 12 will be disposed upon the adjacent sides of the lugs 6 and thus when they are driven transversely of the bridging member between the lugs and the adjacent edges of the openings 9' through which they extend, they will function to separate the edges of the plates slightly. In the case of a unit extended horizontally across a vertical seam such as the seam or joint 13, the wedge pins would be disposed upon the remote sides of the lugs and when forced or driven transversely of the bridging element, will function to draw the vertical edges of the plates 3 and 4 into the desired relation for welding.

The bridging elements or members formed of T-iron are also constructed or shaped as right angles, as indicated generally by the numeral 14, in which case each of the arms of the angles will be provided with apertures corresponding to the apertures 9—9' of the straight bridging bodies. These angled bridging bodies are designed for connecting two plate units together where such units are disposed in perpendicular relation as, for example, the units or plates 1 and 2. In using the angled bridging bodies in this position, the wedge pins 12 will be disposed upon the remote sides of the lugs 6 and by this means the bottom edge of the vertical plate 2 can be drawn into the desired relation with the top face of the horizontal bottom plate 1.

In Figs. 5 to 7, a different form of the bridging member is illustrated. In this form of the invention, the bridging member, which is indicated generally by the numeral 15, is constructed from channel iron so that each bridging body member has a back portion 16 and the parallel edge flanges or webs 17. The back 16 of the channeled bridging member is provided with a pair of longitudinally extending apertures 18, each of which is adjacent one end of the member and the webs 17 are provided adjacent each end and in the transverse line with the openings 18 with elongated oppositely disposed slots 19.

In Fig. 5 one of the channeled bridging members is shown extending across the seam or gap 20 formed between two adjacent edges of plates 21 and these plates are provided adjacent the said edges with the apertured lugs 6 which are welded to the plates and which are spaced apart the proper distance, when the edges of the plates are brought together, to be engaged in the slots 18 in the back of the channeled bridging member. After the bridging member is engaged over the lugs 6, the drift pins 11 are passed through the lugs and through the slots in the two webs or side portions 17 of the bridging member. The wedge pins 12 are then inserted transversely of the ends of the bridging member and through the transversely alined slots 19, upon the adjacent sides of the holding lugs 6. If the plates 21 are to be shifted outwardly as might be the case if they are bottom plates of a tank or other construction or if the plates are to be drawn together as might be the case if they are vertically disposed, then the wedge pins would be inserted through the slots 19 at the remote sides of the lugs 6.

The inner faces of the webs 17 of the channeled bridging members may be reinforced through the area in which the slots 19 are formed by having short strips of metal welded thereto, as indicated at 22, these strips, of course, being provided with slots to correspond with the slots formed in the webs.

Fig. 7 illustrates the construction of an angled bridging member formed of channeled material wherein such angled member is indicated generally by the numeral 23 and would, of course, be employed for drawing together and holding in a desired relation two plates which are to be welded together in right angular or perpendicular relation, such plates being indicated by the numeral 24. It will be apparent that the angled bridging member is of exactly the same construction as the straight bridging member 15 with the single exception that it is bent intermediate its ends so as to provide two right angular portions in each of which the lug and pin receiving slots, here indicated respectively by the numerals 25 and 26, are formed, the first slots being in the back of the channeled body and receiving the fixed lugs 6 which are welded to the faces of the plates 24 and which receive the drift pins 11 to hold the bridging member in position, while the wedge pins 12 are passed transversely of the two end portions of the member through the alined slots 26 and across one side of the lugs.

By this arrangement, it will be readily seen that the plates 24 will not only be drawn into the desired relation and held until welded together, but that the bridging member also maintains the plates at the required angle with one another.

Figs. 8 to 10 illustrate still another form of the invention. In the use of this form, the fixed supporting or holding lugs 6 are also employed, these lugs being here shown as being secured to two plates 27 adjacent to edges of these plates which are to be drawn together for the formation of a joint or seam 28. The bridging member in this form of the invention is indicated as a whole by the numeral 29 and comprises two anchor plates 30, each of which has an aperture 31 for the reception of a lug 6 and each of which is provided with a right angularly turned portion 32 which is enlarged to form, or has secured to one face thereof, a threaded nut 33. Connecting the nuts 33 carried by the two angled portions 32 of the plates 30, is a turnbuckle screw 34 or a screw having right and left-hand threads, the ends of which screw are threadably engaged in the nuts 33. At the center of the screw is a crank or an arm 35 by which rotation may be imparted to the screw for the purpose of drawing together or shifting apart the plates 30. Drift pins 11 are extended transversely through the lugs 6 to maintain the plates 30 in position.

Where the bridging member 29 is to be used at a corner to hold two right angularly related plates such as those indicated by the numerals 36, the lugs are, of course, used as in all of the other cases, one being welded to the side wall and the other to the horizontally disposed or bottom one of the walls 36. However, the bridging body here indicated generally by the numeral 37 has only one flat plate corresponding to the plate 30 and here indicated by the numeral 38, which is provided with an aperture 39 to receive the lug 6 on the vertical wall. To this plate is connected one end of the screw 40. The other end of the screw 40 is threadably extended into a threaded sleeve 41 which at its opposite end is provided with the transverse slot 42 and with an axially directed opening 43 which connects with the transverse slot 42 and which receives the lug 6 of the horizontal plate. A drift pin is extended through the transverse opening 42 of the sleeve 41 and through the lug 6 in the manner shown in Fig. 10, thereby coupling the end of the sleeve with the horizontal plate 36. A drift pin is also extended through the lug 6 of the vertical wall, as shown, thereby securing the bridging member in position across the angle so that by rotating the screw 40 in the proper direction, the two plates 36 can be relatively shifted so as to arrange them in the proper position for the formation of the seam or joint 44.

From the foregoing, it will be readily apparent that the devices of the present invention are of simple construction and may, therefore, be easily and economically manufactured while at the same time they are of sturdy form and most importantly of all, they can be readily placed in position and will hold the position in which they are fixed after the plates have been adjusted to the proper relation for the formation of a seam or joint regardless of vibrations or jars which they may receive, whereas in other implements used for the same purpose, the construction is such that the bridging or coupling members and the pins employed for drawing the plates together may easily slip from position and completely fall away from the plates if accidentally struck or if subjected to any severe vibration.

What is claimed is:

1. Apparatus for securing together two bodies to be joined by welding, comprising a bridging member adapted to extend across adjacent edges of the bodies, said bridging member having apertures for the reception of apertured lugs carried by the two bodies, means engaging in the apertures of the lugs and extending across the bridging member to hold the latter against disengagement from the lugs, said bridging member having slots disposed adjacent to said lugs, and wedge members insertible in said slots to extend across and contact the adjacent lugs, the said slots being closed around the wedging members whereby such members are held against movement outwardly from the bridging member.

2. Apparatus for securing together two bodies which are to be coupled by welding, comprising a bridging member designed to extend across the adjacent edges of the bodies, said bridging member having a longitudinally extending web disposed upon the side remote from the bodies, the bridging member having apertures adapted to receive fixed lugs secured to the bodies and further having longitudinally directed closed slots in its web adjacent said apertures, pin members insertible through said apertured lugs to extend across the bridging body, and wedge pins insertible through said closed web slots across said lugs and simultaneously engaging the adjacent lug and an edge of the slot which encircles and holds the wedge pins against displacement outwardly from the bodies and bridging member.

3. Apparatus for coupling together two bodies which are to be joined by welding, comprising apertured lugs secured to the bodies adjacent the edges to be joined, a bridging member designed to extend across said adjacent edges and having a back portion provided with longitudinally directed elongated apertures each of which receives a lug, said bridging member including a longitudinally directed web upon the side of the back remote from the bodies, said web having a longitudinally directed slot therein adjacent each of said apertures, drift pins designed for extension through the apertured lugs to lie across the bridging member, and tapered wedging pins insertible through the slots of said web for disposition across a side of the adjacent lug, the edges of the slots of the web encircling the tapered pins and maintaining the tapered pins against displacement outwardly from the coupled bodies.

4. Apparatus for coupling together two bodies which are to be joined by welding, comprising apertured lugs secured to the bodies adjacent the edges to be joined, a bridging member designed to extend across said adjacent edges and having a back portion provided with longitudinally directed elongated apertures each of which receives a lug, said bridging member including a longitudinally directed web upon the side of the back remote from the bodies, said web having a longitudinally directed slot therein adjacent each of said apertures, drift pins designed for extension through the apertured lugs to lie across the bridging member, and tapered wedging pins insertible through the slots of said web for disposition across a side of the adjacent lug, the edges of the slots of the web extending around the tapered pins and maintaining the tapered pins against displacement outwardly from the coupled bodies, said web being disposed upon the longitudinal center of the back of the bridging member and the said slots of the web opening into the apertures of the back portion of the body but being closed at their ends and along the side adjacent the free edge of the web.

5. Apparatus for coupling together bodies to be joined by welding, comprising a bridging member formed of channeled material having a back portion and longitudinal edge webs, apertured securing lugs secured to the bodies adjacent to the adjoining edges thereof, said bridging member having a back portion provided with longitudinally elongated apertures for the reception of said lugs, the web portions of said bridging member having longitudinally extending oppositely disposed closed slots therein adjacent each of said apertures, pins insertible through said slots and the adjacent lugs, and tapered pins insertible through said slots for extension transversely of the bridging body across and in contact with the adjacent lug, the tapered pins being entirely encircled by the edges of the closed slots and held thereby against movement outwardly from the coupled bodies.

6. Apparatus for coupling and holding two bodies together in a desired relation, comprising an elongated member designed to bridge the joint between the bodies, said member having a pair of apertures each designed to receive an apertured lug carried by a body, said member having a longitudinally extending portion projecting away from the bodies and extending transversely to the apertures of the lugs, said longitudinally extending portion having adjacent each lug a lengthwise extending closed slot which has a length greater than the extent of the lug longitudinally of the member, a pin extending through each slot and through the aperture of the adjacent lug, and a wedging pin extending through and encircled by the edge of each slot between an edge thereof and an edge of the lug, said wedging pins each being maintained against displacement away from the member by the encircling edge of the slot.

P. L. BAUMGARD.